(12) United States Patent
Ma et al.

(10) Patent No.: US 12,315,249 B2
(45) Date of Patent: May 27, 2025

(54) REMOTE SENSING INTERPRETATION

(71) Applicant: Deere & Company, Moline, IL (US)

(72) Inventors: Hongxu Ma, San Jose, CA (US);
Yujing Qian, Mountain View, CA (US);
Yuchi Ma, Madison, WI (US);
Yuanyuan Tian, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 354 days.

(21) Appl. No.: 18/084,468

(22) Filed: Dec. 19, 2022

(65) Prior Publication Data
US 2024/0203119 A1    Jun. 20, 2024

(51) Int. Cl.
| | |
|---|---|
| *G06V 20/10* | (2022.01) |
| *G06N 5/04* | (2023.01) |
| *G06N 20/00* | (2019.01) |
| *G06Q 50/02* | (2012.01) |
| *G06V 20/70* | (2022.01) |

(52) U.S. Cl.
CPC ............ *G06V 20/188* (2022.01); *G06N 5/04* (2013.01); *G06N 20/00* (2019.01); *G06Q 50/02* (2013.01); *G06V 20/70* (2022.01)

(58) Field of Classification Search
CPC ...... G06V 20/188; G06V 20/70; G06N 20/00; G06N 5/04; G06Q 50/02
USPC ........................................................ 382/110
See application file for complete search history.

(56) References Cited

U.S. PATENT DOCUMENTS

| | | | | |
|---|---|---|---|---|
| 11,321,347 | B1* | 5/2022 | Clifford | G06V 20/17 |
| 12,225,846 | B2* | 2/2025 | Vandike | A01B 79/005 |
| 2023/0104695 | A1* | 4/2023 | Pethe | G06T 7/0016 |
| | | | | 345/419 |

(Continued)

OTHER PUBLICATIONS

Guan et al., "Diagnosis of Fruit Tree Diseases and Pests Based on Agricultural Knowledge Graph" International Conference on Advances in Optics and Computational Sciences. Journal of Physics: Conference Series. doi:10.1088/1742-6596/1865/042052. 9 pages, dated 2021.

(Continued)

*Primary Examiner* — William D Titcomb
(74) *Attorney, Agent, or Firm* — HANLEY, FLIGHT & ZIMMERMAN, LLC

(57) ABSTRACT

Implementations are described herein for obtaining a sequence of high-elevation images capturing a particular geographic area during a particular time period in a plurality of spectral bands; applying the sequence of high-elevation images as input to upstream machine learning model(s) to generate remote sensing embeddings indicating terrain feature(s) of the particular geographic area; applying agricultural data obtained from a local agricultural knowledge graph as input to additional upstream machine learning model(s) to generate agricultural knowledge embedding(s); inferring a natural-language description of a status of the particular geographic area based on generating: an aggregate representative embedding that semantically represents a plurality of agricultural conditions of the particular geographic area, and a natural-language description of one or more of the plurality of agricultural conditions of the particular area using a large language model; and causing a user device associated with an agricultural entity to present the natural-language description of the status.

20 Claims, 6 Drawing Sheets

(56) References Cited

U.S. PATENT DOCUMENTS

2024/0144424 A1* 5/2024 Ma .................. G06T 3/4053

OTHER PUBLICATIONS

Qin et al., "Agriculture Knowledge Graph Construction and Application" Journal of Physics: Conference Series. doi:10.1088/1742-6596/1756/1/012010, 9 pages, dated 2020.

* cited by examiner

REMOTE SENSING INTERPRETATION

BACKGROUND

Vision data captured from high elevations, such as vision data captured by vision sensors of satellites deployed in near-earth orbits, is useful for a variety of agricultural monitoring purposes. Vision data that captures hundreds, thousands, or even tens of thousands of acres on a farm can be used by agricultural personnel to effectively monitor their crop fields (and/or other areas of their agricultural operations) to make various agricultural predictions and decisions, particularly when operational and/or other observational data describing terrain features in the fields is unavailable or unavailable for certain portions of the fields (in general, or at certain times). For example, it is beneficial to frequently observe agricultural fields for invasive species, declines in crop health, erosion, and/or irrigation monitoring purposes. As another example, it is beneficial to observe the response of crops to application of a new fertilizer or pesticide.

Vision data captured from high elevations, such as satellite imagery, manned aircraft (e.g., airplanes), or images captured by high elevation manned aircraft (e.g., space shuttles), are useful for a variety of agricultural monitoring processes. Acquiring digital imagery from high elevations allows large expanses of land to be captured in the imagery with relatively little effort or cost. This process is sometimes referred to as "remote sensing." On the other hand, there are challenges in using satellite imagery, such as the fact that agricultural personnel may have difficulty interpreting these digital images or effectively using them for monitoring of plant and terrain conditions.

SUMMARY

Vision data captured from high elevations, such as satellite imagery, images captured by high elevation unmanned aerial vehicles (e.g., UAV "drones" or balloons), manned aircraft (e.g., airplanes), or images captured by high elevation manned aircraft (e.g., space shuttles), are useful for a variety of agricultural monitoring processes. For one thing, acquiring digital imagery from high elevations allows large expanses of land to be captured in the imagery with relatively little effort or cost.

One challenge of satellite imagery, however, is that various satellites capture various geographic areas at different points in time, at different frequencies, in different spectral bands, and/or at different spatial resolutions. Thus, the satellite images available that capture a given geographic area at a particular time and/or during a particular time period frequently fail to include certain spectral data, or fail to include certain spectral data at certain resolutions. Moreover, the images from the satellites that do capture the certain spectral data and/or the certain spectral data at the certain resolutions might only be available for certain dates/times.

Another challenge for agricultural entities attempting to leverage satellite image data for use in agricultural monitoring and management is that agricultural personnel may not be able to make use of unlabeled satellite images, and in some cases may even be unable to make effective use of satellite of labeled images due to sheer volume of information, unclear relationships between data points, etc. Yet another challenge is that growers may have difficulty interpreting raw high-resolution data and/or myriad inferences generated based on that raw data. In other words, growers may struggle to "see the forest through the trees."

Thus, it is desirable to leverage machine learning to remotely sense agricultural conditions from high-elevation images capturing a particular geographic area during a particular time period and to use these remotely sensed agricultural conditions to provide agricultural personnel or other entities with intuitive, interpretable output, such as a natural-language status of the particular geographic area, that they are able to understand and make effective use of.

In various implementations discussed herein, a network of machine learning models can be used to remotely sense/infer agricultural conditions relevant to a particular geographic area. These inferred agricultural conditions, which may not necessarily be readily interpretable in raw form by nonexperts, may be used to generate a natural-language descriptive status of the particular geographic area to provide to agricultural entities monitoring or managing the particular geographic area.

In some implementations, this may be accomplished by causing one or more processors to perform a method that includes: obtaining a sequence of high-elevation images capturing a particular geographic area during a particular time period, wherein the sequence of high-elevation images includes a plurality of images capturing the particular geographic area in a plurality of spectral bands; applying the sequence of high-elevation images as input to one or more upstream machine learning models to generate a plurality of remote sensing embeddings indicating one or more terrain features of the particular geographic area remotely sensed based on processing the sequence of high-elevation images; applying agricultural data obtained from a local (e.g., a field-level) agricultural knowledge graph associated with the particular geographic area as input to one or more additional upstream machine learning models to generate one or more agricultural knowledge embeddings; and inferring a natural-language description of a status of the particular geographic area.

In some implementations, this inferring includes: applying the plurality of remote sensing embeddings and the one or more agricultural knowledge embeddings as input to one or more downstream machine learning models to generate, as output, an aggregate representative embedding that semantically represents a plurality of agricultural conditions of the particular geographic area; and generating, using a large language model, the natural-language description of one or more of the plurality of agricultural conditions of the particular area.

Some implementations further provide for causing a user device associated with an agricultural entity to present the natural-language description of the status of the particular geographic area to the agricultural entity. For example, a natural-language descriptive status of a particular field may be presented to agricultural personnel operating a user device.

In some implementations, the sequence of high-elevation images includes a plurality of timestamps each associated with a respective image of the plurality of image. In some such implementations, applying the sequence of high-elevation images as input to the one or more upstream machine learning models to generate the plurality of remote sensing embeddings indicating the one or more terrain features of the particular geographic area remotely sensed based on processing the sequence of high-elevation images includes: preprocessing the sequence of high-elevation images to generate: a plurality of spectral embeddings each associated with a respective spectral band of the plurality of spectral bands, and a plurality of temporal embeddings each associated with a respective timestamp of the plurality of timestamps; and applying the plurality of spectral embeddings and the plurality of temporal embeddings as input to the one or more upstream machine learning models to generate the plurality of remote sensing embeddings. In some such implementations, the plurality of spectral embeddings indicate temporal data included in the sequence of high-elevation images for each particular spectral band corresponding to the plurality of images, and the plurality of temporal embeddings indicate spectral data included in the sequence of high-elevation images for each particular point in time corresponding to the plurality of timestamps.

In some of these implementations, applying the plurality of spectral embeddings and the plurality of temporal embeddings as input to the one or more upstream machine learning models to generate the plurality of remote sensing embeddings includes: applying the plurality of spectral embeddings and the plurality of temporal embeddings to at least one first machine learning model included in the one or more upstream machine learning models to generate, as output, synthetic image data, wherein the synthetic image data includes synthetic spectral band data or synthetic temporal data not included in the sequence of high-elevation images.

In some of these implementations, applying the plurality of spectral embeddings and the plurality of temporal embeddings as input to the one or more upstream machine learning models to generate the plurality of remote sensing embeddings further includes: applying, as input to a remote sensing machine learning model included in the one or more upstream machine learning models, the synthetic image data and the sequence of high-elevation images to generate the plurality of remote sensing embeddings. In some such implementations, inferring the natural-language description of the status of the particular geographic area further includes applying, as additional input to the one or more downstream machine learning models, the synthetic image data to generate the one or more inferred embeddings.

In some of these implementations, the agricultural data is obtained from the local agricultural knowledge graph based on identifying one or more nodes, or one or more edges connecting one or more nodes, included in the local agricultural knowledge graph that are associated with at least one spectral embedding of the plurality of spectral embeddings or at least one temporal embedding of the plurality of temporal embeddings.

In some implementations, generating the natural-language description of the status of the particular geographic area is performed based on user input of the agricultural entity.

In some implementations, a network of transformer machine learning models is used to generate inferred image data capturing terrain features of a given geographic area in certain spectral bands, at certain spatial resolutions, and/or at certain frequencies or points in time based on a plurality of high-elevation images that capture those terrain features in other spectral bands, at higher spatial resolutions, and/or at higher frequencies or certain other points in time.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
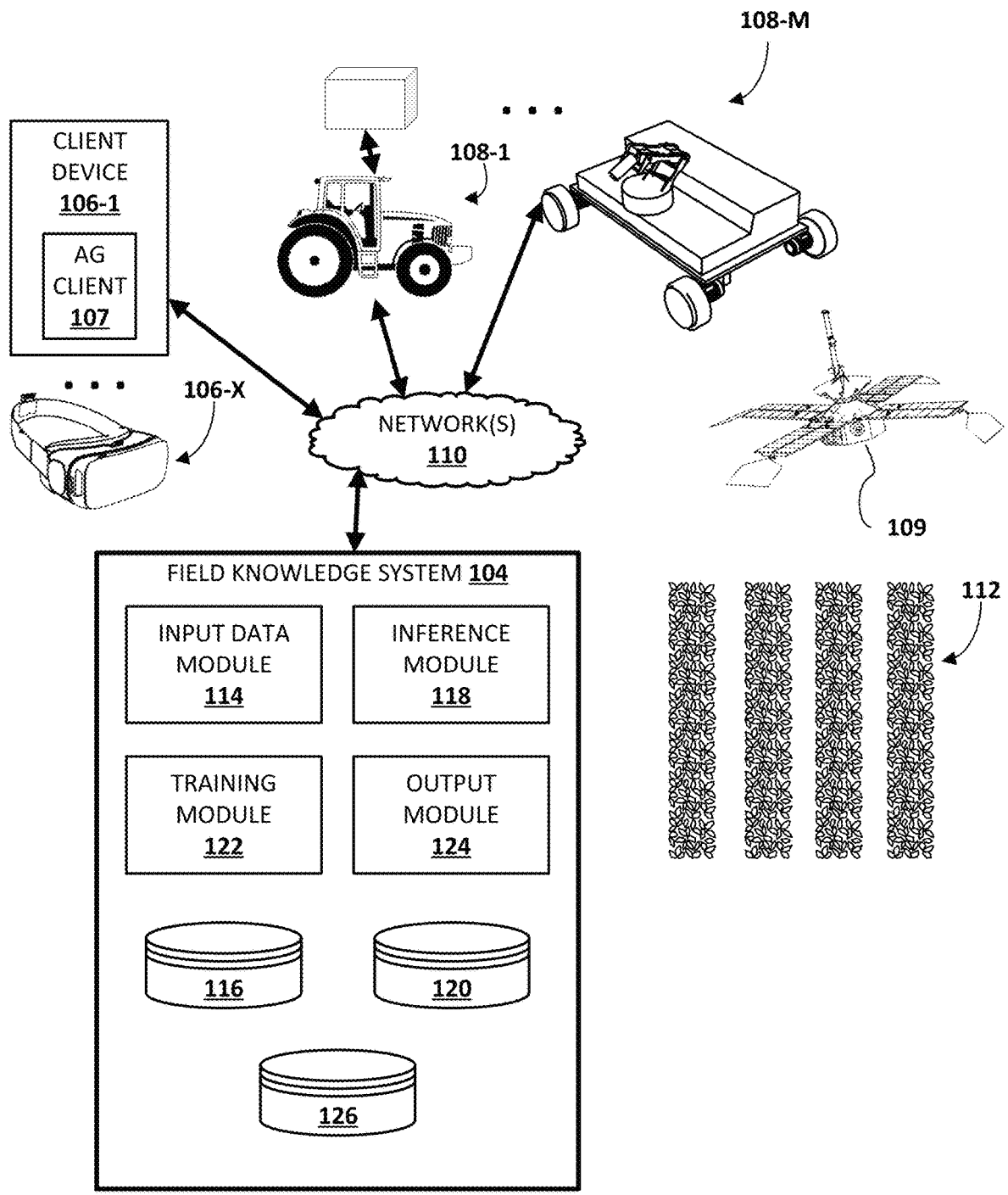
FIG. 1 schematically illustrates an environment in which one or more selected aspects of the present disclosure may be implemented, in accordance with various implementations discussed herein.

FIG. 1 schematically illustrates an environment in which one or more selected aspects of the present disclosure may be implemented, in accordance with various implementations. The example environment includes agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural areas 112 may include agricultural fields displaying various agricultural conditions and being used to grow various types of crops that may produce plant parts of economic and/or nutritional interest. Agricultural areas 112 may include, for instance, one or more crop fields, one or more plots, one or more gardens, or any other areas in which there may be an interest or desire to automatically detect, classify, and/or segment agricultural conditions. "Agricultural conditions" may include agricultural properties or conditions of the terrain or plants growing on the terrain in the agricultural areas 112 and determined based on various types of operational and observational agricultural data, such as digital imagery, other sensor data, and records maintained by agricultural entities. For example, the agricultural conditions determined for a particular agricultural area 112 can include irrigation schedules, presence of weeds or disease, color of terrain, texture of terrain, type of terrain, layout of terrain, plant conditions, and/or various other geographical features of the agricultural areas 112 or phenotypical features of the plants growing in the agricultural areas 112.

Terrain types (or "classes") may include indications of various terrain media (e.g., soil, water, sand, snow, ice, etc.). Terrain colors and textures include colors and textures of image data capturing the terrain. Terrain layout, for example, can include degree of slant or slope, overlaps or gradients between terrain features, etc. Plant conditions may include plant or crop type (e.g., genus, species), plant or crop density, foliage levels, presence-or-absence of plants having certain attributes, etc. As one non-limiting example, there may be considerable interest and/or benefit in tracking plant density in agricultural areas 112 in which certain crops are being grown. Once a significant change in plant density is noted, agricultural personnel or farm machinery can be deployed to investigate or remediate fields in the agricultural areas (e.g., to confirm or correct a weed infestation).

An individual (which in the current context may also be referred to as a "user") may operate one or more client devices 106-1 to 106-X to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") 106-X that provides an AR or VR immersive computing experience, a "smart" watch, and so forth. Additional and/or alternative client devices may be provided.

Field knowledge system 104 is an example of an information system in which the techniques described herein may be implemented. Each of client devices 106 and field knowledge system 104 may include one or more memories for storage of data and software applications, one or more processors for accessing data and executing applications, and other components that facilitate communication over a network. The operations performed by client device 106 and/or field knowledge system 104 may be distributed across multiple computer systems.

Each client device 106 may operate a variety of different applications that may be used to perform various agricultural tasks, such as crop monitoring and diagnosis. For example, a first client device 106-1 operates agricultural ("AG") client 107 (e.g., which may be standalone or part of another application, such as part of a web browser). Another client device 106-X may take the form of an HMD that is configured to render 2D and/or 3D data to a wearer as part of a VR immersive computing experience. For example, the wearer of client device 106-X may be presented with 3D point clouds representing various aspects of objects of interest, such as edges and boundaries between various colors, textures, types, and elevations of terrains. The wearer may interact with the presented data, e.g., using HMD input techniques such as gaze directions, blinks, etc.

In some implementations, AG client 107 may be used to present to agricultural personnel instructions and/or information that can help them perform various agricultural tasks, such as predicting crop yields, seeking recommendations for crop management, scouting crop fields for potential expansion, etc. For example, output module 124 (described in more detail below) may generate a status, a notification, a report, a map, an image, instructions, and/or any other data that may be presented to an operator of a client device using a graphical user interface, audibly, etc. These data may inform the agricultural personnel where fields having certain plant or terrain features (e.g., unexpected levels of plant or foliage density, erosion, flooding, etc.) are located, so that agricultural personnel can better determine which action(s) should be taken on certain plants and/or portions of the terrain.

In some implementations, farm machinery 108-1 to 108-M may be deployed to perform various agricultural tasks, including but not limited to weed remediation, plant harvesting, etc. Farm machinery 108-1 to 108-M may take various forms, such as tractor 108-1, a robot (not depicted) that is propelled along a wire track, rail, or similar components that passes over and/or between crops, wheeled robots 108-M, or any other form of farm machinery capable of being propelled or propelling itself past or over crops or portions of terrain of interest.

In some implementations, different farm machinery may have different roles, e.g., depending on their capabilities. For example, in some implementations, one or more pieces of farm machinery 108-1 to 108-M may be designed to capture data, others may be designed to manipulate plants or perform physical agricultural tasks, and/or others may do both. Farm machinery 108 may include/be equipped with various types of sensors, such as vision sensors (e.g., 2D digital cameras, 3D digital cameras, 2.5D cameras, infrared cameras, etc.), inertial measurement unit ("IMU") sensors, Global Positioning System ("GPS") sensors, X-ray sensors, moisture sensors, lasers, barometers (for local weather information), photodiodes (e.g., for sunlight), thermometers, etc. In some implementations, modular sensor packages may be affixed to conventional farm equipment such as tractors, irrigation booms, etc.

Vision sensors (e.g., 2D digital cameras, 3D cameras, 2.5D cameras, infrared cameras, etc.) can also be deployed at or above near-earth orbit elevation levels via one or more satellites 109. High-elevation vision data gathered in this manner can be used to remotely sense various agricultural conditions of a given geographic area and make agricultural inferences, as described herein. The high-elevation vision data can be gathered by one or more vision sensors deployed on one or more satellites and can include image data captured at various points in time, in various spectral bands, and at various spatial resolutions.

In various implementations, field knowledge system 104 may be implemented across one or more computing systems that may be referred to as the "cloud," at one or more edge computing devices that are local to the farm, or any combination thereof. Field knowledge system 104 may receive the vision data capturing a particular agricultural area 112 and generated by one or more satellites 109 at various points in time, in various spectral bands, and/or at various spatial resolutions, as well as agricultural data obtained from an agricultural knowledge graph (not depicted) and received from agricultural entities and/or determined based on past vision data, and process them using one or more neural networks, as will be described in more detail below. Based on this data, field knowledge system 104 may generate a natural-language status describing the remotely sensed agricultural conditions of the particular geographic area and/or including agricultural inferences determined based on the remotely sensed agricultural conditions of the particular geographic area. For example, a natural-language status describing remotely sensed agricultural conditions and inferences made based on such for a certain field on a certain farm may be "Soil conditions have been drier than normal for the past month. Consider irrigating more frequently."

These natural-language statuses describing the remotely sensed agricultural conditions and the agricultural inferences made based on such may be relayed to agricultural personnel to help them monitor conditions and perform tasks, for example via AG Client 107 of user device 106.

In various implementations, field knowledge system 104 may include an input data module 114, an inference module 118, a training module 122, and the aforementioned output module 124. Any of modules 114, 118, 122, and/or 124 may be implemented using any combination of hardware and software. In some implementations one or more of modules 114, 118, 122, and/or 124 may be omitted, combined, and/or implemented in a component that is separate from field knowledge system 104.

Field knowledge system 104 may also include one or more databases. For example, field knowledge system 104 may include, in communication with input data module 114, an imagery database 116 for storing image data captured by, for instance, agricultural personnel, farm machinery 108, and/or satellite 109. Field knowledge system 104 may also include a machine learning model database 120 that includes the various machine learning models described herein. For example, database 120 can include various machine learning models trained to detect agricultural conditions and/or determine relationships between agricultural data associated with a particular geographic area and the spectral, spatial, and temporal information included in the input imagery capturing the particular geographic area. Database 120 may also include one or more large language models trained to generate natural language output, such as a natural language status of a field, based on data and/or inferences (e.g., embeddings) from various sources. In this specification, the term "database" and "index" will be used broadly to refer to any collection of data. The data of the database and/or the index does not need to be structured in any particular way and it can be stored on storage devices in one or more geographic locations.

Field knowledge system 104 may further include a knowledge graph database 126 that includes one or more agricultural knowledge graphs. Some agricultural knowledge graphs may be public and/or may include data about multiple geographic regions (e.g., counties, states, countries, valleys, etc.) at large, such as satellite data, government-provided terrain classifications, climate data, etc. Other "local" agricultural knowledge graphs may be tailored to one or more particular geographic areas (e.g., farms, fields, regions, portions of regions, etc.). The knowledge graphs included in the knowledge graph database 126 can include agricultural data as well as operations data, user inputs, benchmark models, question-answer protocols, and data describing various dynamics between terrain features and past/current/future agricultural conditions in the particular geographic area(s). For example, one or more of the local knowledge graphs stored in the knowledge graph database 126 can include indications of remotely sensed, determined, or otherwise obtained indications of terrain features and/or agricultural conditions for a target area, as well as various other observational and operational data relevant to the target area such as previously captured images, local sensor measurements, and data provided by agricultural entities and/or farm machinery 108. The knowledge graphs included in the knowledge graph database 126 can include nodes representing entities, parameters, and models/protocols and edges each connecting two or more of those nodes that represent relationships between the connected nodes. Entities may include abstract and/or concrete concepts such as specific people, locations (e.g., individual fields or farms), objects, various agricultural data sources, digital imagery, sensor data, etc.

Input data module 114 may be configured to obtain input from various sources, such as imagery database 116 purposed as an imagery clearinghouse, as well as from sources such as satellite(s) 109, user device(s) 106 of agricultural personnel, farm machinery 108, and/or other repositories of recorded agricultural data for the agricultural areas 112. Input data module 114 may then provide this data to inference module 118 and/or to training module 122. In other implementations, input data module 114 may be omitted and the functions described herein as being performed by input data module 114 may be performed by other components of field knowledge system 104, such as inference module 118 or training module 122.

Inference module 118 may be configured to employ the various machine learning models stored in machine learning model database 120 to process the imagery and/or other data obtained from input data module 114 and/or one or more of databases 116 or 126. For example, inference module 118 may use one or more machine learning models to process one or more instances of input satellite imagery to upsample/downsample a spatial or temporal resolution of the input imagery, to impute missing values or remove obstructions in the input imagery, and/or to generate feature vectors or other representative embeddings in latent space that describe (e.g., semantically) terrain features and agricultural conditions of a given area that are remotely sensed based on the high-elevation (e.g., satellite) image data included in the input imagery.

Training module 122 may be configured to train the machine learning models stored in machine learning model database 120 using imagery obtained from database 116 and imagery and/or other agricultural data obtained from input data module 114 or database 126. For example, inferences about remedial actions or future agricultural conditions determined based on remotely sensing the current agricultural conditions of a particular geographic area may be stored in one or more of the local knowledge graphs of database 126. Later, training module 122 may determine that new current agricultural conditions match or differ from the predicted agricultural conditions, and training module 122 can further train one or more of the machine learning models described herein based on the differences and/or errors (e.g., using techniques such as gradient descent, back propagation, etc.).

Training module 122 may also update one or more machine learning models stored in database 120 based on receiving user input in response to presenting a natural-language status describing inferred agricultural conditions for a particular field, farm, etc. to agricultural personnel, such as via AG Client 107 and user device 106. In some implementations, users of AG Client 107 may provide user input indicating whether the provided natural-language descriptive status(es) are adequate or correct, and/or user input including additional data to be stored or used by one or more components of farm knowledge system 104. For example, training module 122 may train one or more of the machine learning models discussed herein based on user input received by farm knowledge system 104 responsive to providing a natural-language descriptive status when the received user input includes any of: an indication of user dissatisfaction and/or satisfaction, an indication of a "cross-out" or "circle" input gesture performed on one or more words displayed on a touch screen of user device 106, or free form natural language input (e.g., voice or textual input provided to a digital assistant executing on user device 106 and interfacing with AG Client 107). Therefore, while any of the machine learning models described herein may be pre-trained to generate the certain kinds of embeddings, inferences, knowledge graph data, and/or other data as described in more detail below with respect to FIGS. 2-7, training module 122 may further train one or more of these machine learning models to be more precise or fine-tuned to a given agricultural entity's needs.

Training module 122 may also be configured to create and/or update the local knowledge graphs of database 126 based on the newly received input(s) to the field knowledge system 104 and/or based on determined or inferred agricultural conditions. For example, in some implementations, training module 122 may add one or more nodes or one or more edges to a local knowledge graph included in database 126. The new nodes and/or edges may indicate, for example, newly determined or inferred agricultural conditions, newly received sensor measurements obtained from farm machinery 108, user input received from agricultural personnel (e.g., adjustments to benchmark models), and/or they may include image data or representations of such (e.g., representative embeddings).

In various implementations, various machine learning models described herein may be used by inference module 118 to process high-elevation images (and/or sequences of high-elevation images) in order to generate natural-language descriptive statuses for particular fields, farms, other agricultural areas, or portions of such other agricultural areas to ensure that agricultural personnel receive indications of the agricultural conditions of the relevant agricultural area(s) that they can understand. The process(es) used to remotely sense the agricultural conditions from the high-elevation imagery, to make agricultural inferences based on these remotely sensed agricultural conditions, and to generate the natural-language descriptive statuses for agricultural areas 112 will be discussed in more detail below with respect to FIGS. 3-5.

In some implementations, input data module 114 and/or inference module 118 may use one or more of the machine learning models stored in database 120 to preprocess the high-elevation imagery in order to generate synthetic "super-resolution" image data at a greater spatial, spectral, and/or temporal resolution than the original satellite images, as will be discussed in more detail with respect to FIG. 4 below. The synthetic "super-resolution" high-elevation images may then be used by input data module 114 and/or inference module 118 as a supplement to or a substitute for one or more of the original satellite images in the inputs to one or more of the machine learning models discussed herein.

For example, in some implementations, inference module 118 can apply imagery data obtained from vision module 114 as inputs across a group of neural networks stored in machine learning model database 120 to generate output synthetic "super-resolution" image data. This output synthetic "super-resolution" image data may depict the various agricultural conditions that are remotely sensed based on the input satellite image data. However, this output synthetic "super-resolution" image data can also include additional synthetic spectral, spatial, and/or temporal information with respect to these various agricultural conditions, compared to the input satellite imagery data.

One or more components of field knowledge system 104, such as input data module 114 and/or inference module 118, may be configured to navigate/traverse the agricultural knowledge graphs stored in database 126 to identify various data sources that are relevant to (e.g., influence, influenced by) the agricultural conditions of a particular geographic area. The agricultural data obtained based on identifying these various data sources of the agricultural knowledge graph(s) are then processed as input using one or more machine learning models of database 120 for use in making inferences about remotely sensed agricultural conditions in a given agricultural area 112, as discussed herein.

Likewise, one or more of the machine learning models (which may or may not be neural-network based) stored in database 120 may be pre-trained to make agricultural inferences about the agricultural conditions of agricultural area(s) 112 captured in and determined based on the input satellite imagery and/or other agricultural data obtained from one or more of the agricultural knowledge graphs of database 126. Moreover, in some implementations described herein, one or more of the machine learning models may infer a change or rate of change in one or more of the agricultural conditions detected from time-stamped sequences of the ground truth satellite images and/or the generated synthetic "super-resolution" image data.

Various types of machine learning models may be used to process the input data (e.g., imagery, sensor data, agricultural records data, etc.) and infer, classify, and/or segment terrain features and agricultural conditions detected in one or more agricultural areas 112. These machine learning models may include, for instance, feed forward neural networks, convolutional neural networks ("CNN"), recurrent neural networks, long short-term memory ("LSTM") neural networks, gated recurrent unit ("GRU") neural networks, various types of transformers, such as BERT (Bidirectional Encoder Representations from Transformers) transformers, other attention-based transformers, etc. For example, in some implementations, one or more CNNs may be trained to generate output indicative of the presence and/or absence of certain agricultural conditions depicted in imagery and/or other input agricultural data. As another example, in some implementations, a time-series and/or sequence-to-sequence machine learning model such as an RNN, LSTM, and/or transformer may be trained to process sequences of satellite images to generate output indicative of certain agricultural conditions, and/or indicative of changes or rates of change of certain agricultural conditions over time.

In some implementations, inference module 118 can use one or more of the machine learning models discussed herein to extract features (e.g., distinguishable features) from the high-elevation images, to generate one or more feature vectors or other representative embeddings for the high-elevation images in latent space. Additionally or alternatively, inference module 118 can use one or more of the machine learning models described herein, such as a large language model (e.g., a transformer trained on large corpus of natural language documents, particularly documents pertaining to agriculture), to process textual data included in the agricultural data and data sources identified from the agricultural knowledge graphs of database 126, either alone or alongside the high-elevation images, to generate a text representation (e.g., "text embedding") for the text in a latent space. This text embedding may semantically indicate/represent values, factors, or correlative relationships associated with agricultural conditions in the given agricultural area 112. Inference module 118 can then use one or more of the machine learning models discussed herein to process the text embeddings and the image embeddings representative of the high-elevation images, or the text embeddings and the high-elevation images themselves, to generate an agricultural feature vector that indicates the detected agricultural conditions and their attributes (e.g., degree of severity, correlations between certain agricultural conditions, etc.).

As noted previously, in some implementations, the one or more machine learning models of database 120 can include a transformer model. As used herein, a "transformer model" refers to a self-attention model that at least includes one or more self-attention network layers, without utilizing any recurrent or convolutional layers. For instance, one or more image transformer models discussed herein can be pre-trained to receive, as input, a high-elevation (e.g., satellite) image(s) and to generate, as corresponding output, a representative image embedding. The high-elevation image can be pre-processed and divided into a plurality of image patches, along with a plurality of corresponding positional embeddings that indicate relative positions for respective image patches of the high-elevation image. The image transformer model can process each image patch with its respective positional embedding to generate the image embedding representative of the input high-elevation image.

Likewise, one or more knowledge graph transformers discussed herein can be pre-trained to receive, as input, data included in the nodes and/or edges of one or more of the local knowledge graphs stored in database 126 and to generate, as corresponding output, a representative knowledge embedding indicating the knowledge obtained from the local knowledge graphs. In some implementations, the knowledge graph transformer model can process each piece of knowledge obtained from the knowledge graphs along with a positional embedding indicating a relative position within a given geographic area corresponding to that piece of knowledge (e.g., indicating which field) to generate embeddings representing agricultural knowledge obtained from the knowledge graphs. Additionally or alternatively, knowledge graphs may be encoded into semantically rich vectors/embeddings using other types of machine learning techniques, such as graph neural networks (GNNs).

Further, in some implementations, one or more transformer models described herein may be pre-trained to receive, as inputs, both image data and text data (and/or image embeddings and knowledge embeddings) to generate aggregate agricultural condition embeddings representing (e.g., semantically) a plurality of agricultural conditions determined based on processing both the remotely sensed terrain features of the image embeddings and the agricultural knowledge included in the knowledge embeddings.

In order to generate a descriptive natural language status that describes the agricultural conditions of the given agricultural area and/or the inferences determined based on such, one or more of inference module 118 and/or output module 124 can then apply the agricultural feature vector as input to the aforementioned large language model (e.g., a machine learning model that can recognize, predict, and generate natural language on the basis of very large text-based data sets) trained to generate a descriptive status of agricultural inferences and remotely sensed agricultural conditions associated with the high-elevation images in a natural language format that the user is able to understand. In some implementations, inference module 118 and/or output module 124 may use indications of user input received from agricultural personnel or other agricultural entities, for example via AG Client 107 of user device 106, as input(s) to the large language model to generate the descriptive natural language status for the given agricultural area 112. For example, agricultural personnel may provide a request or inquiry via typed or spoken input to AG Client 107 on user device 106 about one or more particular agricultural conditions of the given agricultural area 112. Inference module 118 may apply an indication of that request or inquiry as an input to the large language model in order to generate a descriptive natural language status that includes information relevant to the user's request or inquiry.

Further, in some implementations, inference module 118 and/or output module 124 may navigate/traverse a public knowledge graph (e.g., included in database 126) that includes various nodes and edges connecting nodes that correspond to question-answer protocols, indications of user input parameters/selections/queries, generally applicable agricultural information, etc. This public knowledge graph may be used, e.g., by module 118 and/or 124, in obtaining data and/or making agricultural inferences. These data and/or agricultural inferences may be used, e.g., in conjunction with the large language model, to generate the descriptive natural-language status for the given agricultural area 112.

Output module 124 may be configured to provide the natural language status describing the agricultural conditions and inferences relevant to the given agricultural area 112 to one or more client devices 106 via AG clients 107 over network(s) 110. In some implementations, output module 124 may additionally or alternatively provide the descriptive natural language status to one or more remote servers or databases via network(s) 110, and AG clients 107 on client devices 106 may obtain access to the descriptive natural language status from the one or more remote servers or databases.

In some implementations, one or more agricultural robots or autonomous rovers may be deployed based on the determined agricultural inferences and/or agricultural conditions. For example, if significant changes to certain agricultural conditions happen at a threshold rate, rover(s) or aerial drone(s) may be deployed to the affected areas of a given agricultural field 112 to provide weed or pest remediation, or to gather soil samples or additional low-elevation image data that may help agricultural personnel to diagnose a potential problem (e.g., which plant disease is causing the defoliation in a given field). In some such implementations, in addition to or instead of generating a natural language status, techniques described herein may be implemented to generate robotic commands to cause the rover(s) and/or drone(s) to perform various remedial actions. For instance, the large language model may be trained to predict robotic commands, in addition to or instead of natural language.

In some implementations, AG client 107 installed on one or more client devices 106 can additionally provide ground truth and/or inferred image data and/or other sensor for display on the user interface of the client device(s) 106. In such implementations, agricultural personnel can provide user input to the user interface selecting at least a portion of one or more instances of high-elevation image data (e.g., selecting a portion of a synthetic high-elevation image) or other sensor data (e.g., selecting a "soil moisture level" option), and AG client 107 can provide user selection data indicating the user selection to field knowledge system 104. In response to receiving this indication of a user selection, inference module 118 or output module 124 can then provide, for display on the user interface of the client device(s) 106 via AG client(s) 107, a descriptive natural language status and one or more instances of ground truth or inferred image/sensor data depicting the agricultural conditions relevant to the portion of the agricultural area 112 that corresponds to the user selection. Additionally or alternatively, in some implementations, agricultural inferences may be relayed to agricultural personnel in other manners that communicate agricultural conditions and corresponding locations in one or more fields, such as an annotated grid or a textual report.

Figure 2:
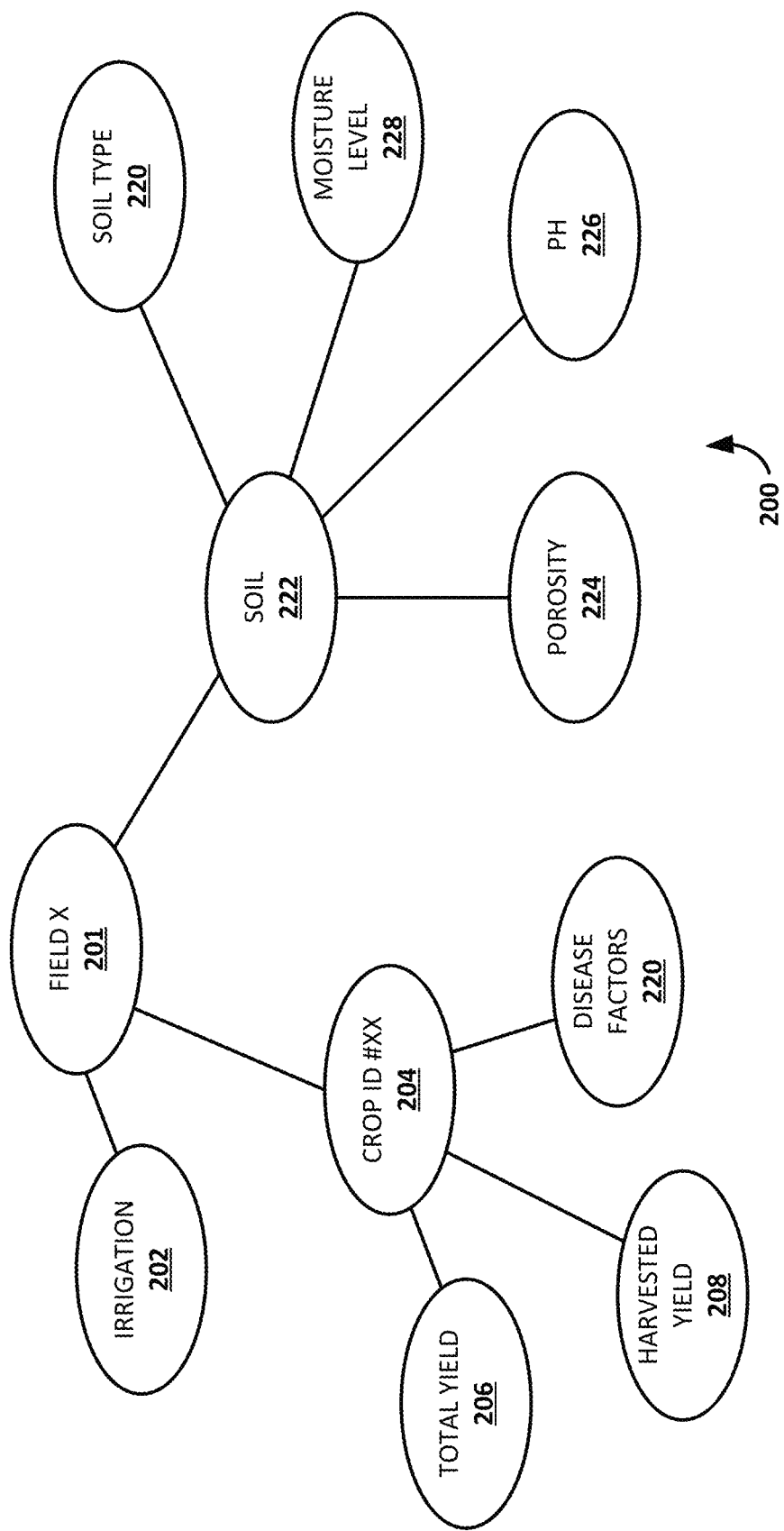
FIG. 2 schematically illustrates an example of an agricultural knowledge graph, in accordance with various implementations described herein.

FIG. 2 illustrates an example local (or "private," or "field-level") agricultural knowledge graph 200 in accordance with various implementations disclosed herein. The elements depicted in FIG. 2 may be implemented across various components of various computer systems, such as one or more components of computing system(s) that implement field knowledge system 104, or in some cases, on client device(s) to prevent exposing sensitive information to the cloud.

The example private/local agricultural knowledge graph 200 includes a plurality of nodes connected by a plurality of edges. The nodes of agricultural knowledge graph 200 represent agricultural entities, and in some cases may provide access to data, by directly storing the data or by pointing to data sources such as memory locations, databases, spreadsheets, application programming interfaces (APIs), etc. The edges of agricultural knowledge graph 200 may represent relationships between those agricultural entities. Entities may also include concepts such as specific people, locations (e.g., individual fields or farms), objects, various agricultural data sources, digital imagery, sensor data, etc. For example, agricultural knowledge graph 200 includes a root agricultural node 201 which identifies a particular field on a farm ("Field X") and is connected to an irrigation node 202 as well as two branch nodes, Crop ID #XX 204 and Soil 222, that connect various other nodes to the Field X node 201. In the illustrated example, the Crop ID #XX node 204 is further connected to the Total Yield 206, Harvested Yield 208, and Disease Factors 220 nodes. Similarly, Soil node 222 is connected to the Soil Type 220, Moisture Level 228, pH 226, and Porosity 224 nodes.

The nodes captured in agricultural knowledge graph 200 are merely illustrative. In some implementations, an agricultural knowledge graph 200 can include one or more additional or alternative nodes, such as a temperature node, a harvesting date node, a planting date node, a date format node, a precipitation node, a crop type node, one or more nodes containing representative image embeddings, one or more additional nodes, and/or combinations thereof. Additionally or alternatively, the nodes can be connected in a variety of configurations. For example, in some other implementations, the Moisture Level 228 node can be connected to Irrigation node 202 instead of Soil node 222. Moreover, some nodes may be part of a public (or "generic") agricultural knowledge graph that, as described previously, stores public data that is more widely applicable, such as climate data, regional data, satellite data, etc.

In some implementations, different agricultural data for a particular area can capture similar agricultural conditions of that particular area. However, the data may be in a different format. For example, a first table of agricultural data received from a given agricultural entity can capture a harvested yield while a second table of agricultural data can capture a total yield. In other words, while both the first table and the second table capture yield data, the harvested yield in the first table is not immediately comparable with the total yield of the second table. In some implementations, agricultural knowledge graph 200 captures this relationship between harvested yield and total yield with Crop ID #XX node 204, harvested Yield node 208, and Total Yield node 206. Furthermore, the agricultural knowledge graph can include information on normalizing similar data, such as normalizing harvested yield and/or total yield into a single yield metric. Automatically normalizing the data across multiple tables of agricultural data enables the data to be processed using a variety of one or more additional machine learning models, such as a disease prediction model, a crop growth prediction model, a weather prediction model, one or more additional agricultural prediction models, and/or combinations thereof.

One or more components of field knowledge system 104 (or a component of client device 106) may navigate/traverse the agricultural knowledge graph(s) to obtain various types of agricultural data and/or various agricultural data sources associated with one or more particular geographic areas. The one or more machine learning models will thus be used to identify the nodes and/or edges relevant to the particular geographic areas and output sequences of knowledge tokens including or indicating the sources or data associated with the identified nodes and/or edges of the agricultural knowledge graph(s). This output sequence of knowledge tokens can then be applied as a sequence of inputs to one or more downstream machine learning models, as discussed with respect to FIGS. 1, 3, and 4 herein.

Figure 3:
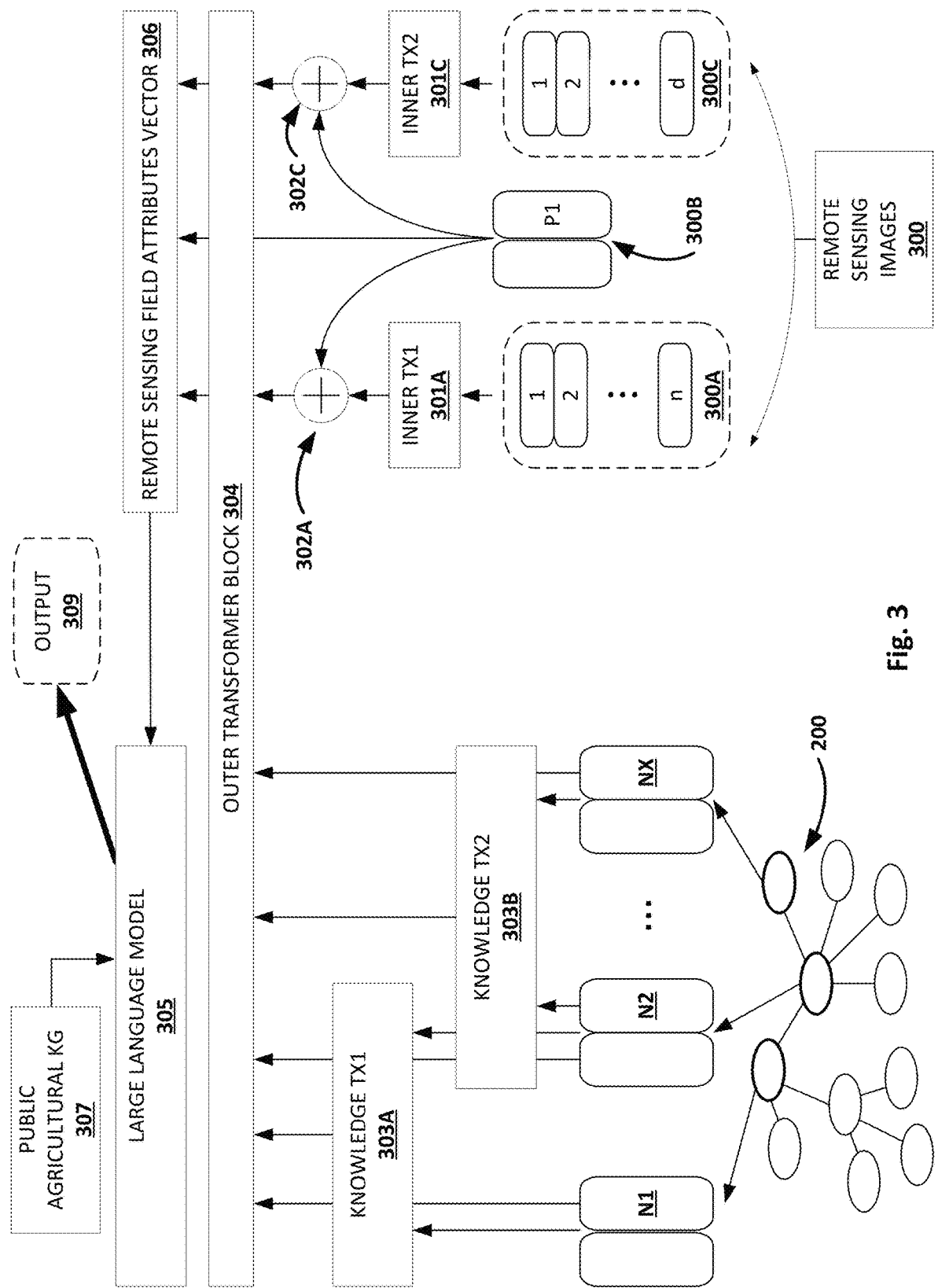
FIG. 3 is a block diagram that schematically illustrates an example of how one or more selected aspects of the present disclosure may be implemented, in accordance with various implementations described herein.

FIG. 3 is a block diagram that illustrates an example of how one or more selected aspects of the present disclosure may be implemented, in accordance with various implementations described herein. The elements depicted in FIG. 3 may be implemented across various components of various computer systems, such as one or more components of computing system(s) that implement field knowledge system 104, client device(s) 106, etc. Moreover, while techniques described with respect to FIG. 3 may be discussed in a particular order, this is not meant to be limiting. One or more techniques discussed herein may be reordered, omitted or added.

The example environment of FIG. 3 includes four inner transformers: inner image tx1 301A, inner image tx2 301B, inner knowledge tx1 303A, and inner knowledge tx2 303B. The example environment of FIG. 3 also includes an outer transformer block 304 and a large language model 305. The sources of the inputs to the inner transformers in the example environment of FIG. 3 include remote sensing images 300 and agricultural data nodes N1-NX obtained from agricultural knowledge graph 200. The example environment of FIG. 3 also includes public knowledge graph 307 and two aggregation models 301A and 301C.

Although inner transformers 301A-B and 303A-B are depicted as single transformers upstream from outer transformer block 304, it should be appreciated that, in some implementations, any of the inner and outer transformers (301A-B, 303A-B, and 304) may comprise its own upstream/downstream neural network employing one or more transformers or other machine learning models described herein. Moreover, in some implementations, one or more of the other types of machine learning models described herein may be used to supplant or replace any of the transformers (301A-B, 303A-B, and 304) of FIG. 3.

The remote sensing images 300 of the example environment of FIG. 3 represent a plurality of instances of high-elevation (e.g., satellite) image data capturing a particular geographic area in various spectral bands and at various points in time during a particular time period, as indicated by a corresponding timestamp associated with each of the plurality of instances of high-elevation image data. In some implementations, as will be discussed in more detail with respect to FIG. 4, the remote sensing images 300 can include ground truth satellite images as well as synthetic "super-resolution" images generated based on the ground truth images and including additional spectral and/or temporal image data than the original ground truth satellite images. In other implementations, the generation of "super-resolution" images may instead be performed by the aggregation models (302A-302C).

In the example environment of FIG. 3, the sequence of remote sensing images 300 may be preprocessed or processed by one or more machine learning models (not depicted) trained to generate a sequence of spectral embeddings 300A, a sequence of temporal embeddings 300C, and an image token 300B. Each spectral embedding of the sequence of spectral embeddings 300A indicates presence, absence, and/or changes in wavelength or intensity of light in a given spectral band over the particular time period captured by the remote sensing images 300 (e.g., a "spectral projection"). Each temporal embedding of the sequence of temporal embeddings 300C indicates all spectral data present in the remote sensing images 300 at a given particular point in time during the particular time period (e.g., a "temporal projection"). For example, there may be a different temporal embedding for each unique timestamp or for particular windows of timestamps that correspond to one or more images included in the remote sensing images 300. The image token 300B includes all spectral and temporal information included in the sequence of remote sensing images 300. For example, the image token 300B may include indications of correlations or other mathematical relationships between the spectral data and the temporal data included in the sequence of remote sensing images 300. For example, the image token 300B can define or indicate the spectral data included in the sequence of remote sensing images 300 as a function of the temporal data included in the sequence of remote sensing images 300 (e.g., a mathematical or graphical model for "spectral information vs. temporal information").

In the example environment of FIG. 3, the sequence of spectral embeddings 300A are applied as inputs to inner tx1 301A to generate output including a plurality of spectral embeddings that semantically represent spectral data associated with terrain features captured by the remote sensing images 300. Likewise, the sequence of temporal embeddings are applied as inputs to inner tx2 301C to generate output including a plurality of temporal embeddings that semantically represent temporal data associated with terrain features captured by the remote sensing images 300.

The spectral embeddings output by inner tx1 301A and the image token 300B are then applied as inputs to spectral aggregation model 302A, which generates first inferred image data (not depicted) based on the inputs. Spectral aggregation model 302A can be any machine learning model trained to take, as inputs, one or more spectral embedding(s) and one or more corresponding image token(s) in order to generate, as output, first inferred image data that semantically represents remotely sensed agricultural conditions of the particular geographic area corresponding to the spectral embeddings and the image token(s).

Likewise, the temporal embeddings output by inner tx2 301C and the image token 300B are applied as inputs to temporal aggregation model 302C, which generates second inferred image data (not depicted) based on the inputs. Temporal aggregation model 302C can be any machine learning model trained to take, as inputs, one or more temporal embedding(s) and one or more corresponding image token(s) in order to generate, as output, second inferred image data that semantically represents remotely sensed agricultural conditions of the particular geographic area corresponding to the temporal embedding(s) and the image token(s). Notably, the first inferred image data and the second inferred image data may indicate the same or different agricultural conditions of the particular geographic area, and in the same or varying amounts of detail.

As noted previously, the agricultural knowledge graph 200 may be traversed in order to identify one or more nodes and/or one or more edges included in the agricultural knowledge graph that are relevant to the particular geographic area being targeted, relevant to a particular location or a particular time period (which may be the same or different from the particular time period/location corresponding to the remote sensing images 300), the terrain features agricultural conditions associated with or indicated by any of the images or embeddings discussed herein, and/or a user request received from the user device 106 and indicating one or more inquiry parameters. For example, nodes N1, N2, . . . NX might be identified from agricultural knowledge graph 200 based on received user input indicating a particular time period and based on a determined relationship between that input particular time period and a particular edge connecting two or more nodes on the knowledge graph. Thus, as depicted in FIG. 3, N1, N2, . . . NX can include agricultural data or data sources stored in nodes and/or edges connecting nodes in the agricultural knowledge graph 200.

Indications of the data or sources associated with the nodes corresponding to N1, N2, . . . NX can then be applied to a series of knowledge transformers 303A-303B based on the connections (or lack thereof) of their corresponding nodes in the agricultural knowledge graph 200. The knowledge transformers 303A-303B are trained to generate correlative embeddings that semantically represent the correlations (and/or dependencies) between the agricultural knowledge associated with two or more connected nodes and/or the edges connecting them.

For example, the agricultural knowledge graph 200 may include a root node N1 indicating a location or identity of the particular field being monitored (e.g., "Field X"), a connection between the root node N1 and a branch node N2 indicating a particular agricultural entity such as "Soil", and a connection between branch node N2 and terminal node NX indicating one or more entity attributes or parameters related to the "Soil" in "Field X". The edges between the nodes N1 and N2 and N2 and NX may, for example, include correlations or other mathematical relationships between entities and/or entity properties stored in nodes. For example, the edge connecting N2 to NX may include one or more equations to use in functions associated with making determinations using the "Soil" node N2 based on the value or value range a current value indicated by NX. Thus, as shown in FIG. 3, in this situation N1 and N2 would both be applied as inputs to knowledge tx1 303A and N2 and NX would both be applied as inputs to knowledge tx2 303B. Moreover, since the output of knowledge tx2 303B provides additional data related to node N2 (e.g., values or functions determined based on data stored in NX or its connecting edge to N2 and relevant to determinations about "Soil" conditions), the output of knowledge tx2 303B is applied as an additional input to knowledge tx1 303A. Since the soil entity parameters or attributes indicated by NX are not relevant to the identity of the particular field (e.g., "Field X") indicated by node N1, beyond what is already indicated by the output of knowledge tx2 303B, neither N1 nor NX are applied to each other's respective knowledge transformer. While FIG. 3 depicts two knowledge transformers, it should be appreciated that any number of knowledge transformers can be used depending on how many nodes or edges are selected and/or their relationships within the agricultural knowledge graph 200.

The output correlative embeddings of knowledge tx1 303A and knowledge tx2 303B and the output instances of inferred image data of spectral aggregation model 302A and temporal aggregation model 302C, as well as the agricultural knowledge embeddings associated with nodes N1, N2, . . . NX and the image token 300B, are applied as inputs to outer transformer block 304 to generate, as output, one or more remote sensing field attributes vectors 306 that indicate the agricultural conditions remotely sensed or otherwise determined to be relevant to the particular field (or other target geographic area) based on processing the embeddings and the image data.

The remote sensing field attributes vector 306 is then applied as input to a large language model 305 that uses the remote sensing field attributes vector 306 as well as data obtained from public agricultural knowledge graph 307 to generate output 309. As noted previously, output 309 may include, in many cases, a natural-language status describing (e.g., in an intuitive way that will be understood by growers that are not data science experts) agricultural inferences about the agricultural conditions determined to be associated with the particular geographic area. The large language model 305 can be applied based on the public agricultural knowledge graph 307 in order to predict which agricultural conditions are relevant to the operations and/or queries of the associated agricultural entities. In some implementations, the system can use the public knowledge graph 307 to determine which actions should be taken by farm personnel in response to certain agricultural conditions, such as when the public knowledge graph 307 includes indications of past remedial actions taken in response to previously sensed agricultural conditions.

The large language model 305 is thus used to process the remote sensing field attributes vector 306 in conjunction with information included in the public knowledge graph 307 to generate a natural-language status that describes the status of the particular geographic target area with respect to the inferred agricultural conditions of the particular geographic area. For example, an output 309 of large language model 305 may include one or more sentences describing current conditions related to past conditions and desirable or remedial actions that may be taken for a particular crop in a particular field.

Figure 4:
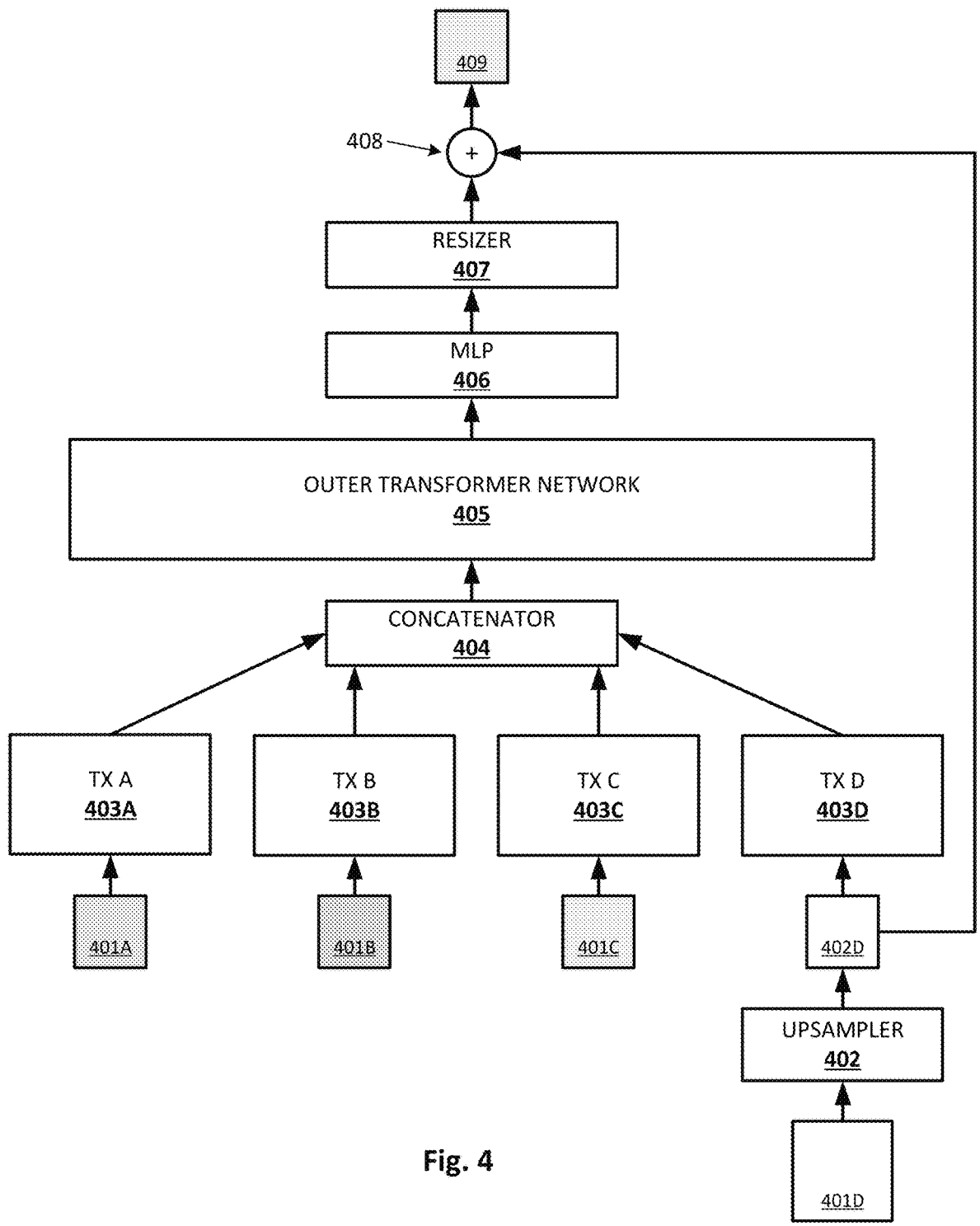
FIG. 4 illustrates another example of how selected aspects of the present disclosure may be implemented.

FIG. 4 is a block diagram that illustrates an example of how one or more selected aspects of the present disclosure may be implemented, in accordance with various implementations described herein. The elements depicted in FIG. 4 may be implemented across various components of various computer systems, such as one or more components of computing system(s) that implement field knowledge system 104. Moreover, while techniques described with respect to FIG. 4 may be discussed in a particular order, this is not meant to be limiting. One or more techniques discussed herein may be reordered, omitted or added.

FIG. 4 depicts high-elevation (e.g., satellite) image data 401A-401D capturing a particular geographic area in various spectral bands, at various spatial resolutions, and at various temporal frequencies and the components used to preprocess this high-elevation image data 401A-401D to infer synthetic "super-resolution" image data 409, as described herein. The methods described with respect to FIG. 4 can be used by one or more components of field knowledge system 104, for example input data module 114 or inference module 118, to preprocess high-elevation imagery to be used as input(s) to various processes discussed with respect to FIGS. 1-3.

The example environment of FIG. 4 includes transformers A-D (403A-403D, respectively), upsampler 402, concatenator 404, outer transformer 405, multi-layer perceptron (MLP) 406, resizer 407, and aggregation model 408. Although transformers A-D (403A-403D, respectively) are depicted as single transformer machine learning models upstream from outer transformer 405, it should be appreciated that, in some implementations, each of the upstream transformers A-D (403A-403D, respectively) and the downstream outer transformer 405 may comprise its own upstream/downstream transformer network. Moreover, in some implementations, one or more other types of machine learning models described herein may supplement or replace any of the upstream or downstream transformers described with respect to FIG. 4. Image data 401A-401D, upsampled image data 402D, and inferred image data 409 of the example environment of FIG. 4 represent various instances of high-elevation image data and/or sequences of various instances of high-elevation image data of various spectral bands, and at various spatial resolutions.

Image data 401A includes high-elevation image data captured in Spectral Band A, for example the Red Band, and in a first spatial resolution, for example 10 m. Image data 401B includes high-elevation image data captured in Spectral Band B, for example the Green Band, and in the first spatial resolution (e.g., 10 m). Image data 401C includes high-elevation image data captured in Spectral Band C, for example the Blue Band, and in the first spatial resolution (e.g., 10 m). Image data 401D includes high-elevation image data captured in Spectral Band D, for example the Red Edge Band, and in the first spatial resolution (e.g., 10 m).

Image data 401D can be upsampled by upsampler 402 to generate upsampled image data 402D, which includes the image data 401D in Spectral Band D (e.g., Red Edge) upsampled to the first spatial resolution (e.g., 10 m) shared by image data 401A-401C. Instances of image data 401A-401C and 402D can correspond to the same geographic area, for example the same 10 m×10 m geographic area, captured by one or more satellites at one or more dates/times. However, instances of image data 401D can correspond to a larger geographic area that contains that same geographic area that image data 401A-401C and 402D correspond to. For example, image data 401D can correspond to a 40 m×20 m geographic area in which that 10 m×10 m geographic area lies.

Image data 401A can be applied as input to transformer A 403A to generate one or more Spectral Band A embeddings that semantically represent one or more agricultural conditions of a corresponding geographical area determined based on processing the Spectral Band A (e.g., Red Band) information included in image data 401A. Likewise, image data 401B, 401C, and 402D can be processed by their respective transformers B-D (403B-403D, respectively) to generate spectral band embeddings corresponding to their respective spectral bands (Spectral Bands B-D, respectively) that semantically represent one or more agricultural conditions of the corresponding geographical area. Note that the same or different agricultural conditions may be present in varying amounts of detail in the instances of image data 401A-401C and 402D that are input to the transformers A-D. Thus, for example, the Spectral Band B (e.g., Green Band) embeddings may semantically describe different agricultural conditions, or semantically describe the agricultural conditions in different ways, compared to the Spectral Band D (e.g., Red Edge) embeddings. "Agricultural conditions", as used herein, may include, for instance, color of terrain, texture of terrain, type of terrain, layout of terrain, plant conditions, and any other geographical features of the agricultural areas 112 detectable in high-elevation satellite imagery captured in any spectral band and at any spatial or temporal resolution.

The spectral band embeddings corresponding to Spectral Bands A-D can then be applied as inputs to the concatenator 404 which can concatenate the embeddings into a single embedding that aggregates the information included in the spectral band embeddings for each Spectral Band A-D. This single embedding is then applied as input to outer transformer 405 as input to generate, as output, one or more descriptive embeddings that semantically describe the relationships between the instances of agricultural condition information that correspond to each of the Spectral Bands A-D. In this way, individual transformers A-D (403A-403D, respectively) can be used to determine agricultural condition information corresponding to each available spectral band, and the outer transformer 405 can be used to determine the relationships between the agricultural condition information described by the spectral band embeddings.

Note that in some implementations, concatenator 404 may be removed and outer transformer 405 may take the spectral embeddings generated by transformers A-D (403A-403D, respectively) directly as inputs. This can allow outer transformer 405 to generate descriptive embeddings that include more semantic information (e.g., information that is otherwise lost or skewed during concatenation), but may also insert more room for misinterpretation. However, such a system may be advantageous when dealing with low spatial resolution images as the images (or portions thereof) of each spectral band may contain little information by themselves, and therefore the semantic information included in their respective embeddings may be more easily skewed by concatenation. Moreover, using images (or portions thereof) from many spectral bands can help to ameliorate the risk of extraneous or illogical information being included in (or omitted from) the output descriptive embeddings of the outer transformer 405 (e.g., information for each spectral band is compared to each other, thus more spectral bands means more "double checks").

The one or more descriptive embeddings output by the outer transformer network 405 are then applied as input to MLP 406. MLP 406 is a multilayer perceptron network that receives the descriptive embeddings as input and then generates, as output, one or more correlative embeddings that represent the correlations (and/or dependencies) between the relationships identified in the descriptive embeddings. Thus MLP 406 generates output correlative embeddings that describe, for example, correlations (and/or dependencies) between how and where certain agricultural conditions are visually represented in Spectral Bands A, B, and/or C compared to how and where they are (or are not) visually represented in Spectral Band D.

The correlative embeddings output by MLP 406 can then be applied as inputs to resizer 407. Resizer 407 may be any machine learning model or other algorithmic process that processes and resizes the one or more correlative embeddings output by the MLP 406 to generate one or more representative image embeddings that expand the spatial and spectral relationship information included in the correlative embeddings to a size representative of the image data 401A-401C, 402D that is fed into the transformers A-D (403A-403D, respectively).

At least one of the one or more representative embeddings can then be combined with an instance of the upsampled image data 402D by aggregation model 408 to generate inferred image data 409. Aggregation model 408 can be any machine learning model trained to take, as inputs, one or more representative embeddings and one or more corresponding instances of upsampled image data 402D in order to generate, as output, inferred image data 409 that depicts the agricultural conditions captured by image data 401D (and/or 402D) as well as one or more of the agricultural conditions captured by image data 401A-401C (if they are different than the agricultural conditions captured by image data 402D and/or 401D) and/or additional detail of the agricultural conditions that were captured by image data 401D but that were captured in more detail in one of the other Spectral Bands A-C in their corresponding instances of image data 401A-401C. Moreover, the output the inferred image data 409 generated by the aggregation model 408 will include image data in Spectral Band D and at the first (higher) spatial resolution (e.g., 10 m) that corresponds to the spatial resolution of the image data 401A-401C and 402D that were applied as inputs to transformers A-D.

Thus, for example, one or more satellites capture instances of image data 401A-401D in spectral bands corresponding to, respectively, the red band (A), the green band (B), the blue band (C), and the red edge band (D). The instances of image data 401A-401C, which respectively correspond to the spectral bands A-C, may be of a higher spatial resolution of 10 m. However, the instance of image data 401D that corresponds to the red edge band may only be captured in a 40 m spatial resolution.

Image data captured in the red edge band may be useful to one or more of the machine learning models used to infer agricultural conditions described herein, as it captures information reflective of nitrogen and chlorophyll content in an agricultural area. It may therefore be desirable to have red edge band image data at a 10 m spatial resolution, which will include more and more precise detail than the red edge band image data at the 40 m spatial resolution. As described above, the red edge band image data 401D may be upsampled to the 10 m resolution and applied as input to transformer D 403D while instances of image data 401A-401C are applied to their respective transformers A-C 403A-403C.

Each of the resulting spectral band embeddings output by transformers A-D 403A-403D can then be applied as input to concatenator 404 to generate a combined embedding which combines the various information gleaned from each of the spectral bands A-D. This combined embedding can be applied as input to the outer transformer 405 to generate the descriptive embeddings which may semantically describe, for example, how each detected agricultural condition is (or is not) represented in each of the spectral bands A-D.

The descriptive embeddings may be applied as input to MLP 406 to generate the correlative embeddings that indicate the overlaps and omissions between the representations of each agricultural condition for each spectral band. For example, the correlative embeddings can indicate that agricultural condition X is captured by both spectral bands A and D, as well as describe the correlations and/or dependencies between how agricultural condition X is represented in Spectral Band A versus how it is represented in Spectral Band D. These correlative embeddings can then be resized by resizer 407 to generate representative image embeddings, which can be used by aggregation model 408 alongside the upsampled image data 402D to infer the synthetic "super-resolution" image data 409 at the 10 m spatial resolution. This synthetic "super-resolution" image data 409 may, for example, more clearly and sharply depict agricultural condition X in the red edge band compared to the input image data 401D and/or the upsampled image data 402D.

Although FIG. 4 depicts four five initial instances of image data 401A-401D corresponding to four different Spectral Bands A-D, it should be appreciated that the processes described with respect to FIG. 4 may be performed with any two or more initial instances of image data each corresponding to any number of spectral bands by simply adding or removing additional or unneeded transformers.

It should also be appreciated that one or more of the other initial instances of image data 401A-401C may also correspond to a different level of spatial resolution (higher/lower than the first spatial resolution) and may be upsampled or downsampled to the first spatial resolution before being applied to a corresponding transformer A-C. In some such implementations, the upsampled/downsampled image data may be treated much the same way image data 402D is in FIG. 4, and the output inferred image data 409 may include image data of multiple spectral bands, for example each spectral band that corresponds to an instance of image data that was upsampled or downsampled before being applied to one of the transformers A-D 403A-403D. Moreover, in some implementations, upsampler 402 may be optional, for example if transformer D 403D, concatenator 404, and/or aggregation model 408 is trained to upsample the image data and/or the data included in one or more of the corresponding input embeddings, or if one or more of the machine learning models downstream from the concatenator in the example environment of FIG. 4 is trained to insert/interpret/ignore null values that are included in or indicated by the embeddings.

Additionally or alternatively, in some implementations, the architecture and processes described with respect to FIG. 4 may be used to increase the temporal resolution of image data corresponding to certain spectral bands. For example, rather than high-elevation image data 401A-401C and 401D corresponding to sequences of high-elevation image data with different spatial resolutions, they could instead correspond to different temporal frequencies. Thus, upsampler 402 could upsample the image data 401D to the same temporal frequency as image data 401A by generating additional images to be included in upsampled image data 402D based on preprocessing the image data 401D.

Figure 5:
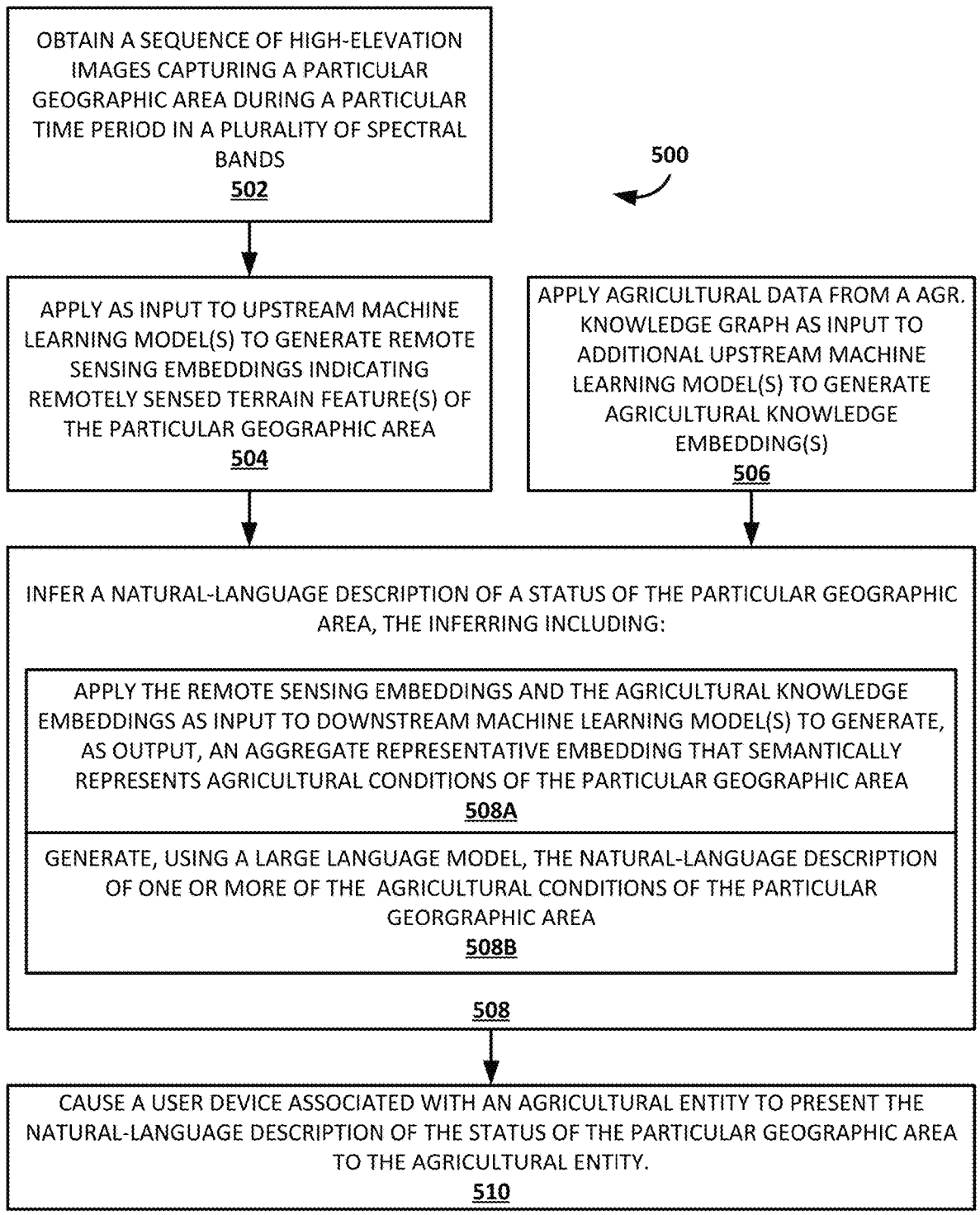
FIG. 5 illustrates a flowchart of an example method for practicing selected aspects of the present disclosure.

FIG. 5 illustrates a flowchart of an example method for practicing selected aspects of the present disclosure. For convenience, the operations of the flowchart are described with reference to a system that performs the operations. This system may include various components of various computer systems, such as one or more components of the client device(s) 106, the field knowledge system 104, and/or the AG client(s) 107. Moreover, while operations of method 500 are shown in a particular order, this is not meant to be limiting. One or more operations may be reordered, omitted, or added.

At block 502, the system obtains a sequence of high-elevation images capturing a particular geographic area during a particular time period. The sequence of high-elevation images can include a plurality of high-elevation images capturing the particular geographic area in a plurality of spectral bands. For example, one or more first high-elevation images included in the sequence can capture the particular geographic area can capture one or more terrain features of the particular geographic area in the Red, Green, and/or Blue spectral bands, while one or more second high-elevation images included in the sequence can capture one or more (of the same/different) terrain features of the particular geographic area in the Red Edge and/or Near Infra-Red (NIR) spectral bands. The various terrain features captured by the sequence of high-elevation images can be associated with various agricultural conditions of the particular geographic area. For example, the captured terrain features can include plant, animal, soil, and climate features of the particular geographic area that may correspond to crops, pest presence, soil erosion, and soil moisture levels that may be relevant to agricultural operations of the particular geographic area.

In some implementations, the sequence of high-elevation images can include one or more time-series sequences of images captured by one or more satellites at various points in time during the particular time periods and/or at varying frequencies. In keeping with the example above, the one or more first high-elevation images can correspond to one or more first points in time during the time period, while the one or more second high-elevation images can correspond to one or more second periods of time during the time period, which may include same/different points in time from the one or more first points in time.

At block 504, the system applies the sequence of high-elevation images (e.g., 300) as input to one or more upstream machine learning models (e.g., 301A, 301C) to generate a plurality of remote sensing embeddings indicating one or more terrain features of the particular geographic area remotely sensed based on processing the sequence of high-elevation images. The one or more upstream machine learning models can include one or more of the machine learning models discussed elsewhere herein. For example, the sequence of high-elevation images may be pre-processed as described with respect to FIG. 4 and then applied as inputs to inner transformers 301A-B of FIG. 3. Thus, the upstream machine learning models used at block 504 can include, for instance one or more neural networks (403A-D) used to reconstruct low-resolution satellite images into higher-resolution satellite images, extract spectral and temporal information about captured terrain features, and generate representative embeddings of the sequence of high-elevation images in latent space (e.g., 301A, 301C).

At block 506, the system applies agricultural data obtained from a local agricultural knowledge graph (e.g., 200) associated with the particular geographic area as input to one or more additional upstream machine learning models (e.g., 303A, 303B) to generate one or more agricultural knowledge embeddings. The local agricultural knowledge graph can include various agricultural data relevant to the particular geographic area as described herein. The one or more additional upstream machine learning models can include one or more of the machine learning models discussed elsewhere herein, such as 303A, 303B. The output agricultural knowledge embeddings can include representative embeddings of the agricultural data obtained from the knowledge graph. For example, the agricultural data obtained from the agricultural knowledge graph can be applied to the one or more inner knowledge transformers 303A-B discussed with respect to FIG. 3 to generate the representative agricultural knowledge embeddings.

At block 508, the system infers a natural-language description of the particular geographic area to provide to an agricultural entity associated with the particular geographic area. In some implementations, block 508 includes two sub-blocks, sub-block 508A and sub-block 508B.

At sub-block 508A, the system applies the plurality of remote sensing embeddings and the one or more agricultural knowledge embeddings as input to one or more downstream machine learning models to generate, as output, an aggregate representative embedding that semantically describe remotely sensed agricultural conditions of the particular geographic area. The one or more downstream machine learning models can include one or more of the machine learning models discussed elsewhere herein, for example outer transformer block 304 of FIG. 3.

At sub-block 508B, the system generates, using a large language model (e.g., 305), the natural-language description of one or more of the plurality of agricultural conditions of the particular geographic area. The large language model (e.g., 305) can correspond to any machine learning model that can recognize, predict, and generate natural language on the basis of very large corpuses of data (e.g., embeddings, agricultural documents, etc.) that has been trained to generate a descriptive status of remotely sensed agricultural conditions that may be relevant to agricultural entities or agricultural operations of the particular geographic area.

In some implementations, sub-block 508B may further include using a public knowledge graph as described herein, such as public knowledge graph 307, to generate the natural-language descriptive status. For example, the public knowledge graph can include various nodes and edges connecting nodes that correspond to question-answer protocols, indications of user input parameters/selections/queries, and other information that is usable to determine what agricultural inference might be useful in response to a situation or query. The system can use the public knowledge graph in order to determine which remotely sensed agricultural conditions are relevant to the operations and/or queries of the associated agricultural entities. In some implementations, the system can use the public knowledge graph to determine which actions should be taken by farm personnel in response to certain remotely sensed conditions, such as when the public knowledge graph includes remedial models or indications of past remedial actions taken in response to previously sensed agricultural conditions.

At block 510, the system causes a user device associated with an agricultural entity to present the natural-language description of the status of the particular geographic area to the agricultural entity. For example, the system can cause AG client 107 running on user device 106 to present the natural-language description of the status of the particular geographic area to the agricultural personnel who requested it, or to incorporate the natural language description of the status into another notification or report to provide to the relevant agricultural entity. Thus, an example natural-language descriptive status may be "Crops X in Field Y appear to be under-watered. Consider increasing irrigation frequency from 1× per week to 2× per week until the end of the dry season."

Figure 6:
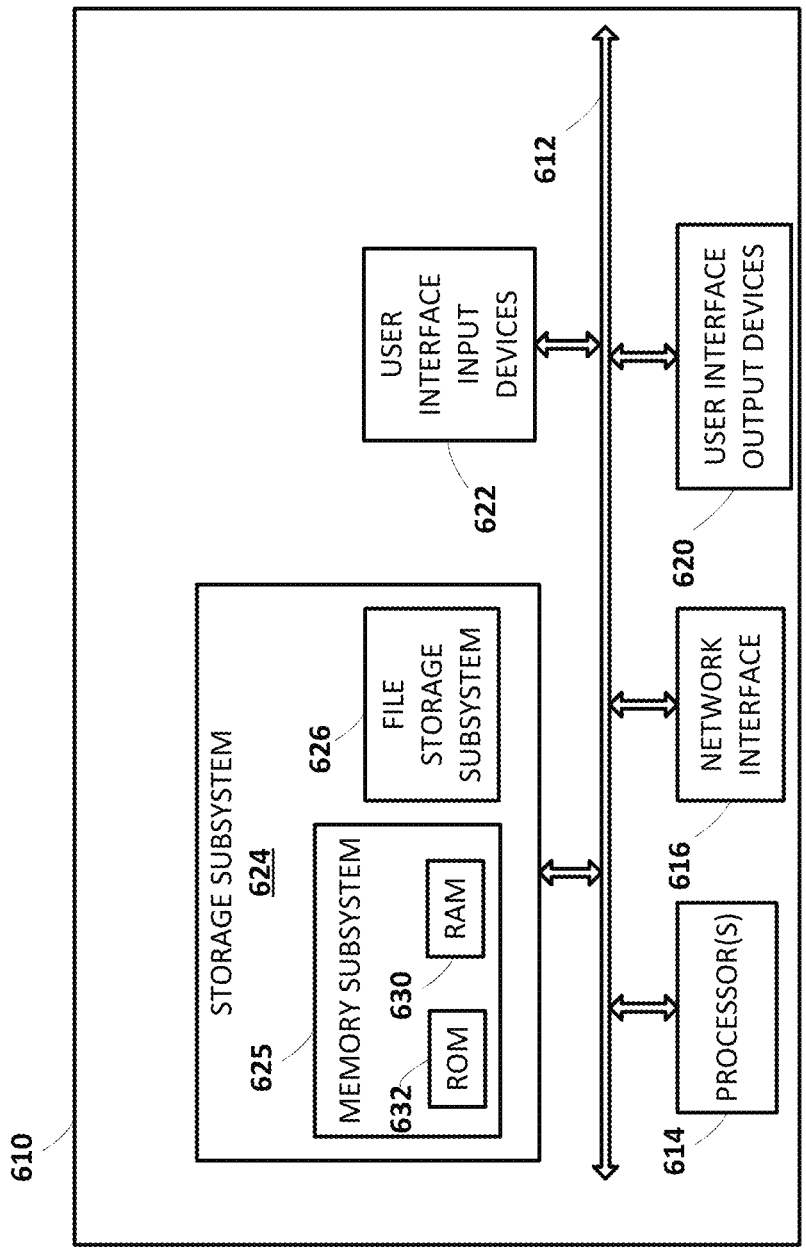
FIG. 6 is a block diagram of an example computing device that may optionally be utilized to perform one or more aspects of techniques described herein.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 500 described herein, as well as to implement various components depicted in FIGS. 1-4.

These software modules are generally executed by processor 614 alone or in combination with other processors. Memory subsystem 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 615.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
   obtaining a sequence of high-elevation images capturing a particular geographic area during a particular time period, wherein the sequence of high-elevation images includes a plurality of images capturing the particular geographic area in a plurality of spectral bands;
   applying the sequence of high-elevation images as input to one or more upstream machine learning models to generate a plurality of remote sensing embeddings indicating one or more terrain features of the particular geographic area remotely sensed based on processing the sequence of high-elevation images;
   applying agricultural data obtained from a local agricultural knowledge graph associated with the particular geographic area as input to one or more additional upstream machine learning models to generate one or more agricultural knowledge embeddings;
   inferring a natural-language description of a status of the particular geographic area, wherein the inferring includes:
      applying the plurality of remote sensing embeddings and the one or more agricultural knowledge embeddings as input to one or more downstream machine learning models to generate, as output, an aggregate representative embedding that semantically represents a plurality of agricultural conditions of the particular geographic area; and
      generating, using a large language model, the natural-language description of one or more of the plurality of agricultural conditions of the particular geographic area; and
   causing a user device associated with an agricultural entity to present the natural-language description of the status of the particular geographic area to the agricultural entity.

2. The method of claim 1, wherein the sequence of high-elevation images includes a plurality of timestamps each associated with a respective image of the plurality of images, and wherein applying the sequence of high-elevation images as input to the one or more upstream machine learning models to generate the plurality of remote sensing embeddings indicating the one or more terrain features of the particular geographic area remotely sensed based on processing the sequence of high-elevation images includes:
   preprocessing the sequence of high-elevation images to generate:
      a plurality of spectral embeddings each associated with a respective spectral band of the plurality of spectral bands; and
      a plurality of temporal embeddings each associated with a respective timestamp of the plurality of timestamps; and
   applying the plurality of spectral embeddings and the plurality of temporal embeddings as input to the one or more upstream machine learning models to generate the plurality of remote sensing embeddings.

3. The method of claim 2, wherein applying the plurality of spectral embeddings and the plurality of temporal embeddings as input to the one or more upstream machine learning models includes applying the plurality of spectral embeddings and the plurality of temporal embeddings to at least one first machine learning model included in the one or more upstream machine learning models to generate, as output, synthetic image data, wherein the synthetic image data includes synthetic spectral band data or synthetic temporal data not included in the sequence of high-elevation images.

4. The method of claim 3, wherein applying the plurality of spectral embeddings and the plurality of temporal embeddings as input to the one or more upstream machine learning models includes applying, as input to a remote sensing machine learning model included in the one or more upstream machine learning models, the synthetic image data and the sequence of high-elevation images to generate the plurality of remote sensing embeddings.

5. The method of claim 3, wherein inferring the natural-language description of the status of the particular geographic area further includes applying, as additional input to the one or more downstream machine learning models, the synthetic image data to generate the one or more inferred embeddings.

6. The method of claim 2, wherein the plurality of spectral embeddings indicate temporal data included in the sequence of high-elevation images for each particular spectral band corresponding to the plurality of images, and wherein the plurality of temporal embeddings indicate spectral data included in the sequence of high-elevation images for each particular point in time corresponding to the plurality of timestamps.

7. The method of claim 2, wherein the agricultural data is obtained from the local agricultural knowledge graph based on identifying one or more nodes, or one or more edges connecting the one or more nodes, included in the local agricultural knowledge graph that are associated with at least one spectral embedding of the plurality of spectral embeddings or at least one temporal embedding of the plurality of temporal embeddings.

8. The method of claim 1, wherein generating the natural-language description of the status of the particular geographic area is performed based on user input of the agricultural entity.

9. A system comprising one or more processors and non-transitory memory storing instructions that, in response to execution by the one or more processors, cause the one or more processors to:
   obtain a sequence of high-elevation images capturing a particular geographic area during a particular time period, wherein the sequence of high-elevation images includes a plurality of images capturing the particular geographic area in a plurality of spectral bands;
   apply the sequence of high-elevation images as input to one or more upstream machine learning models to generate a plurality of remote sensing embeddings indicating one or more terrain features of the particular geographic area remotely sensed based on processing the sequence of high-elevation images;

apply agricultural data obtained from a local agricultural knowledge graph associated with the particular geographic area as input to one or more additional upstream machine learning models to generate one or more agricultural knowledge embeddings;

infer a natural-language description of a status of the particular geographic area, wherein the instructions to infer include instructions to:

apply the plurality of remote sensing embeddings and the one or more agricultural knowledge embeddings as input to one or more downstream machine learning models to generate, as output, an aggregate representative embedding that semantically represents a plurality of agricultural conditions of the particular geographic area; and generate, using a large language model, the natural-language description of one or more of the plurality of agricultural conditions of the particular geographic area; and cause a user device associated with an agricultural entity to present the natural-language description of the status of the particular geographic area to the agricultural entity.

10. The system of claim 9, wherein the sequence of high-elevation images includes a plurality of timestamps each associated with a respective image of the plurality of images, and wherein the instructions to apply the sequence of high-elevation images as input to the one or more upstream machine learning models to generate the plurality of remote sensing embeddings include instructions to:

preprocess the sequence of high-elevation images to generate:

a plurality of spectral embeddings each associated with a respective spectral band of the plurality of spectral bands; and a plurality of temporal embeddings each associated with a respective timestamp of the plurality of timestamps; and apply the plurality of spectral embeddings and the plurality of temporal embeddings as input to the one or more upstream machine learning models to generate the plurality of remote sensing embeddings.

11. The system of claim 10, wherein the instructions to apply the plurality of spectral embeddings and the plurality of temporal embeddings as input to the one or more upstream machine learning models include instructions to apply the plurality of spectral embeddings and the plurality of temporal embeddings to at least one first machine learning model included in the one or more upstream machine learning models to generate, as output, synthetic image data, wherein the synthetic image data includes synthetic spectral band data or synthetic temporal data not included in the sequence of high-elevation images.

12. The system of claim 11, wherein the instructions to apply the plurality of spectral embeddings and the plurality of temporal embeddings as input to the one or more upstream machine learning models include instructions to apply, as input to a remote sensing machine learning model included in the one or more upstream machine learning models, the synthetic image data and the sequence of high-elevation images to generate the plurality of remote sensing embeddings.

13. The system of claim 11, wherein the instructions to infer the natural-language description of the status of the particular geographic area further include instructions to apply, as additional input to the one or more downstream machine learning models, the synthetic image data to generate the one or more inferred embeddings.

14. The system of claim 10, wherein the plurality of spectral embeddings indicate temporal data included in the sequence of high-elevation images for each particular spectral band corresponding to the plurality of images, and wherein the plurality of temporal embeddings indicate spectral data included in the sequence of high-elevation images for each particular point in time corresponding to the plurality of timestamps.

15. The system of claim 10, wherein the agricultural data is obtained from the local agricultural knowledge graph based on identifying one or more nodes, or one or more edges connecting the one or more nodes, included in the local agricultural knowledge graph that are associated with at least one spectral embedding of the plurality of spectral embeddings or at least one temporal embedding of the plurality of temporal embeddings.

16. The system of claim 9, wherein the natural-language description of the status of the particular geographic area is generated based on user input of the agricultural entity.

17. At least one non-transitory computer-readable medium comprising instructions that, when executed by one or more processors, cause the one or more processors to:

obtain a sequence of high-elevation images capturing a particular geographic area during a particular time period, wherein the sequence of high-elevation images includes a plurality of images capturing the particular geographic area in a plurality of spectral bands;

apply the sequence of high-elevation images as input to one or more upstream machine learning models to generate a plurality of remote sensing embeddings indicating one or more terrain features of the particular geographic area remotely sensed based on processing the sequence of high-elevation images;

apply agricultural data obtained from a local agricultural knowledge graph associated with the particular geographic area as input to one or more additional upstream machine learning models to generate one or more agricultural knowledge embeddings;

infer a natural-language description of a status of the particular geographic area, wherein the instructions to infer include instructions to:

apply the plurality of remote sensing embeddings and the one or more agricultural knowledge embeddings as input to one or more downstream machine learning models to generate, as output, an aggregate representative embedding that semantically represents a plurality of agricultural conditions of the particular geographic area; and generate, using a large language model, the natural-language description of one or more of the plurality of agricultural conditions of the particular geographic area; and cause a user device associated with an agricultural entity to present the natural-language description of the status of the particular geographic area to the agricultural entity.

18. The at least one non-transitory computer-readable medium of claim 17, wherein the sequence of high-elevation images includes a plurality of timestamps each associated with a respective image of the plurality of images, and wherein the instructions to apply the sequence of high-elevation images as input to the one or more upstream machine learning models to generate the plurality of remote sensing embeddings include instructions to:

preprocess the sequence of high-elevation images to generate:
- a plurality of spectral embeddings each associated with a respective spectral band of the plurality of spectral bands; and
- a plurality of temporal embeddings each associated with a respective timestamp of the plurality of timestamps; and apply the plurality of spectral embeddings and the plurality of temporal embeddings as input to the one or more upstream machine learning models to generate the plurality of remote sensing embeddings.

19. The at least one non-transitory computer-readable medium of claim 18, wherein the instructions to apply the plurality of spectral embeddings and the plurality of temporal embeddings as input to the one or more upstream machine learning models include instructions to apply the plurality of spectral embeddings and the plurality of temporal embeddings to at least one first machine learning model included in the one or more upstream machine learning models to generate, as output, synthetic image data, wherein the synthetic image data includes synthetic spectral band data or synthetic temporal data not included in the sequence of high-elevation images.

20. The at least one non-transitory computer-readable medium of claim 19, wherein the instructions to apply the plurality of spectral embeddings and the plurality of temporal embeddings as input to the one or more upstream machine learning models include instructions to apply, as input to a remote sensing machine learning model included in the one or more upstream machine learning models, the synthetic image data and the sequence of high-elevation images to generate the plurality of remote sensing embeddings.

* * * * *